Mar. 3, 1925.  
A. A. HEYMAN  
1,528,482  
MACHINE FOR FORMING CIGAR BUNCHES  
Filed April 21, 1922  8 Sheets-Sheet 1
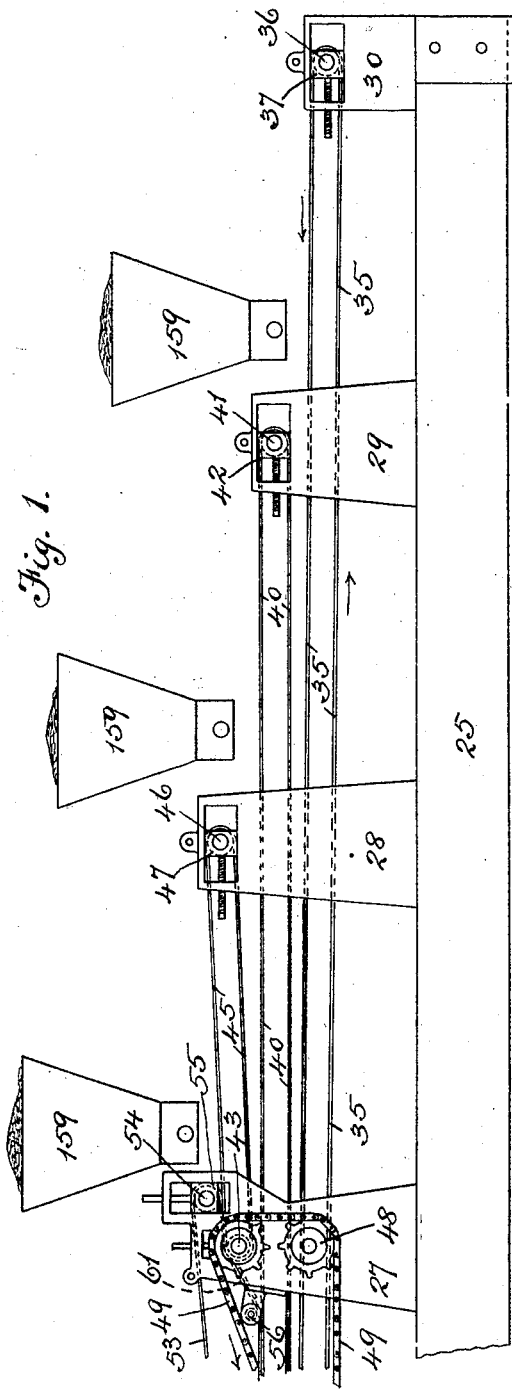
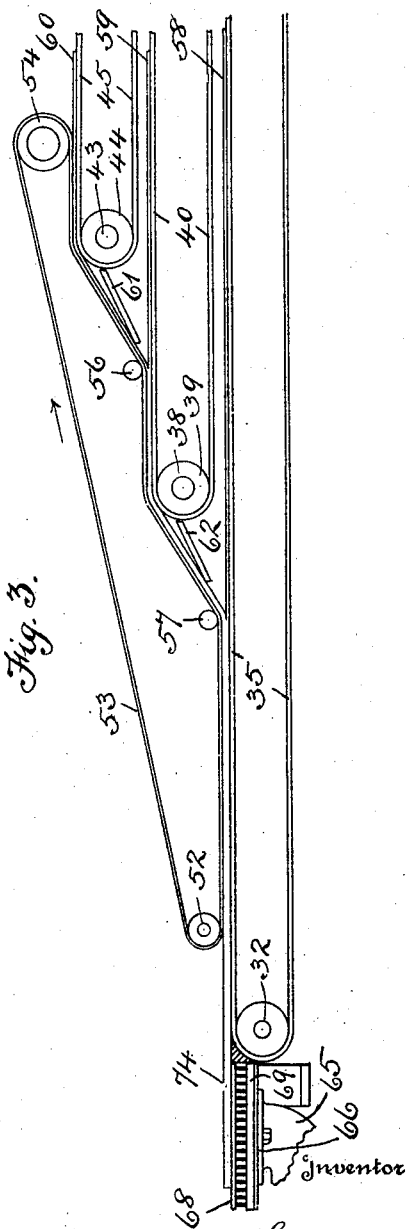
Inventor  
Albert A. Heyman  
By  
Attorney

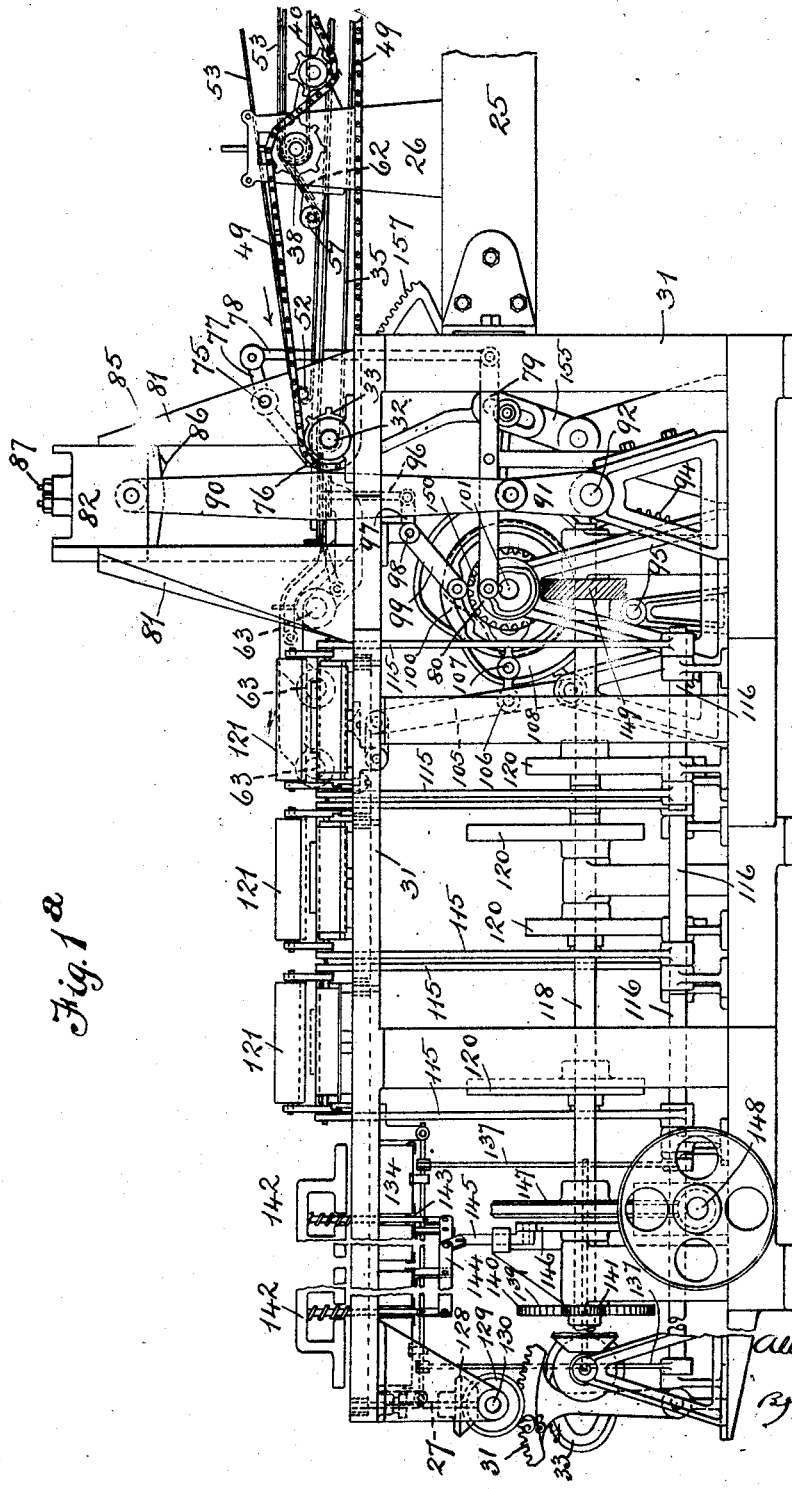

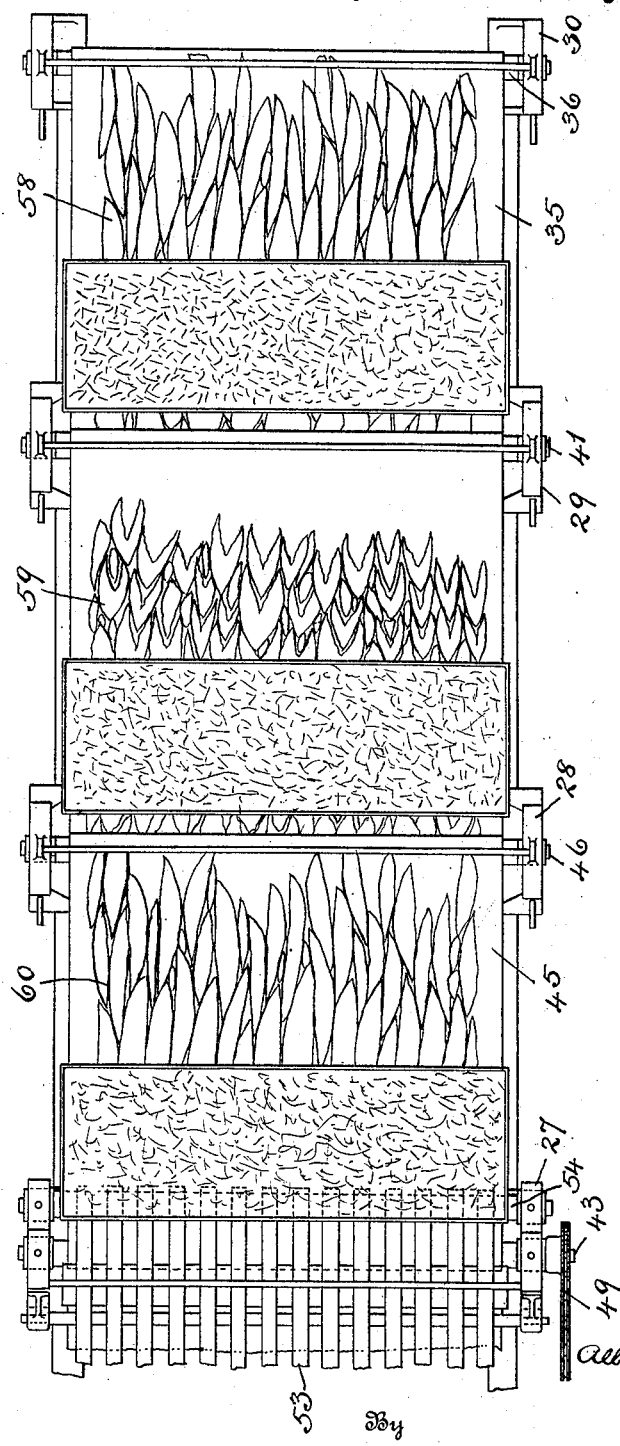

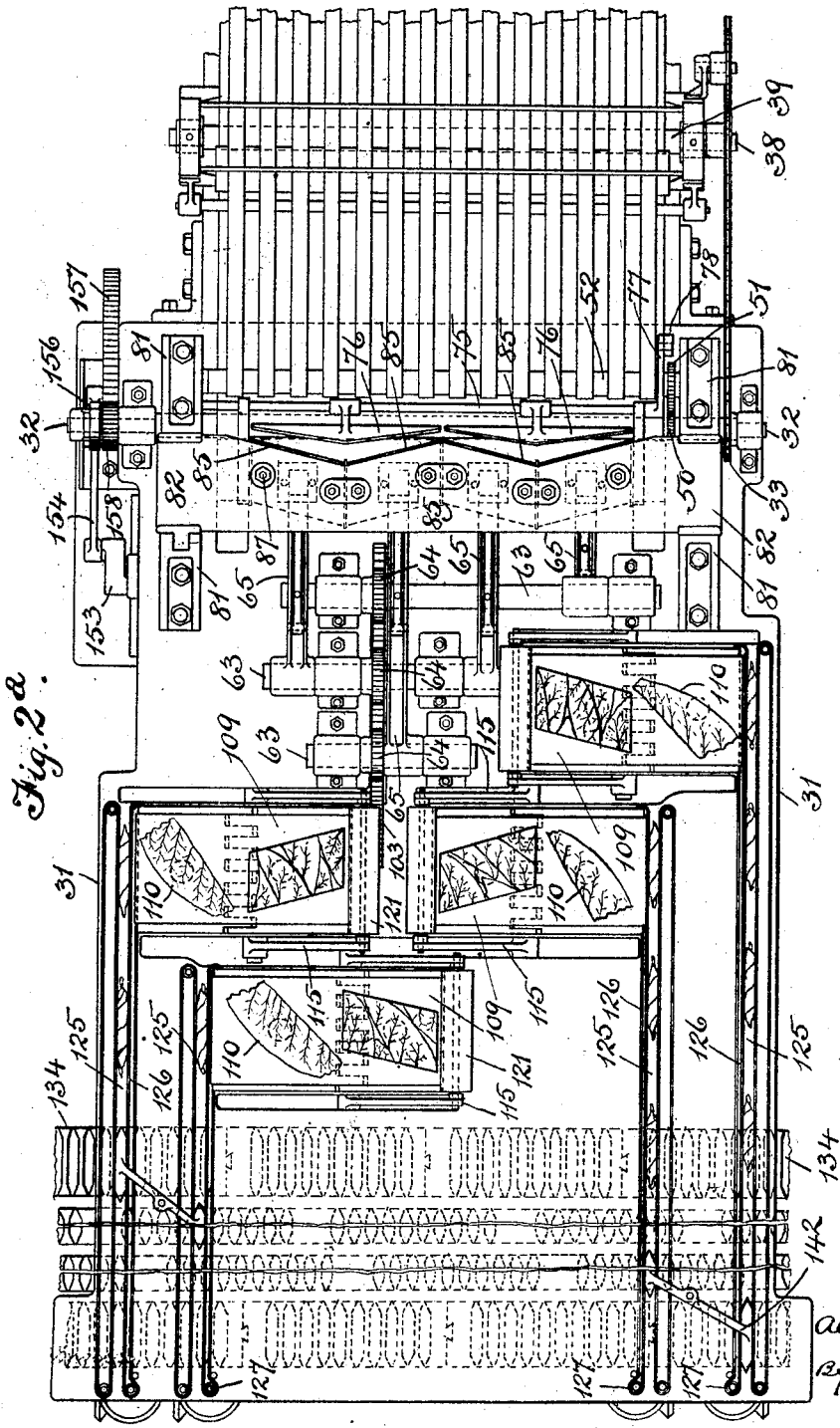

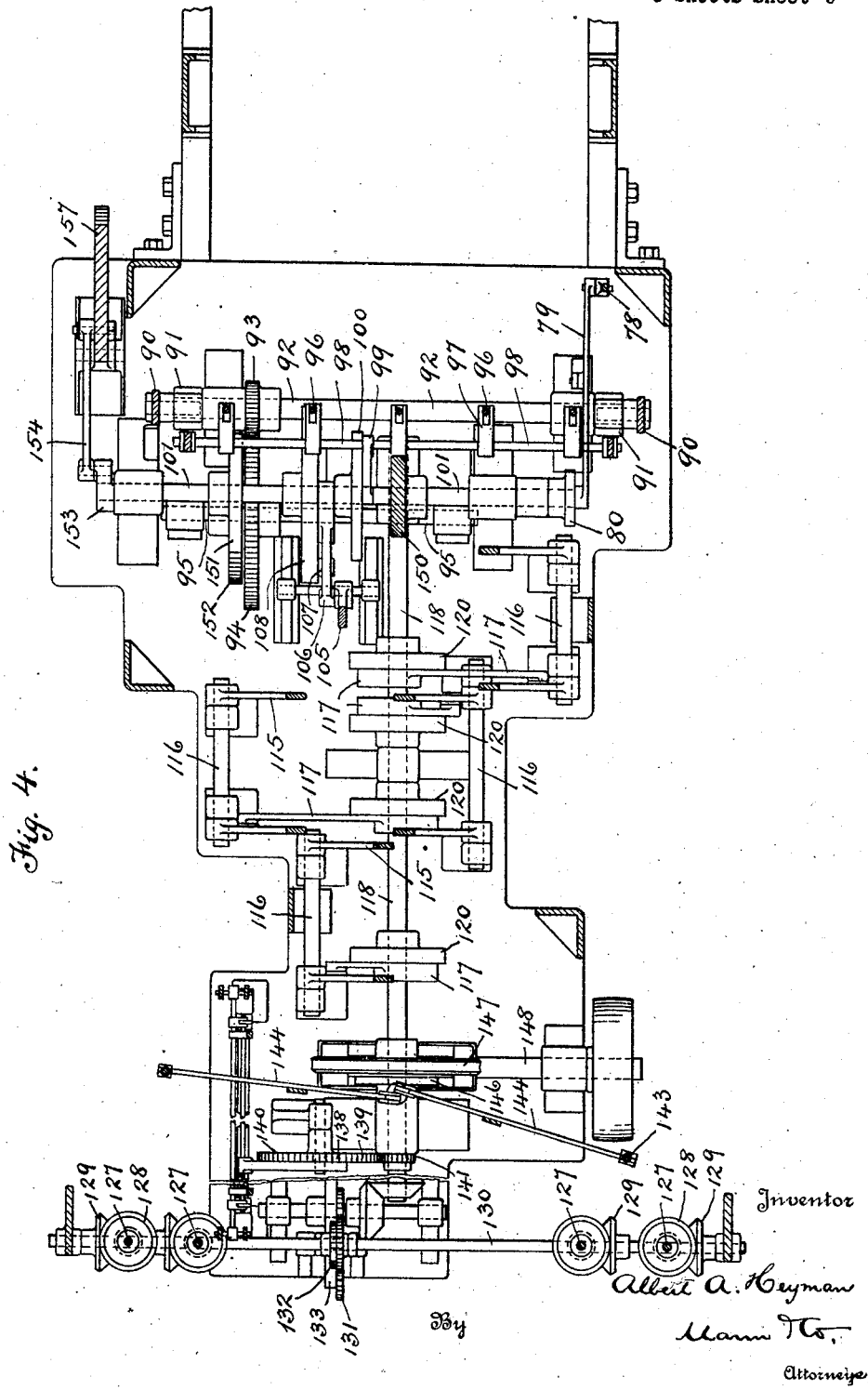

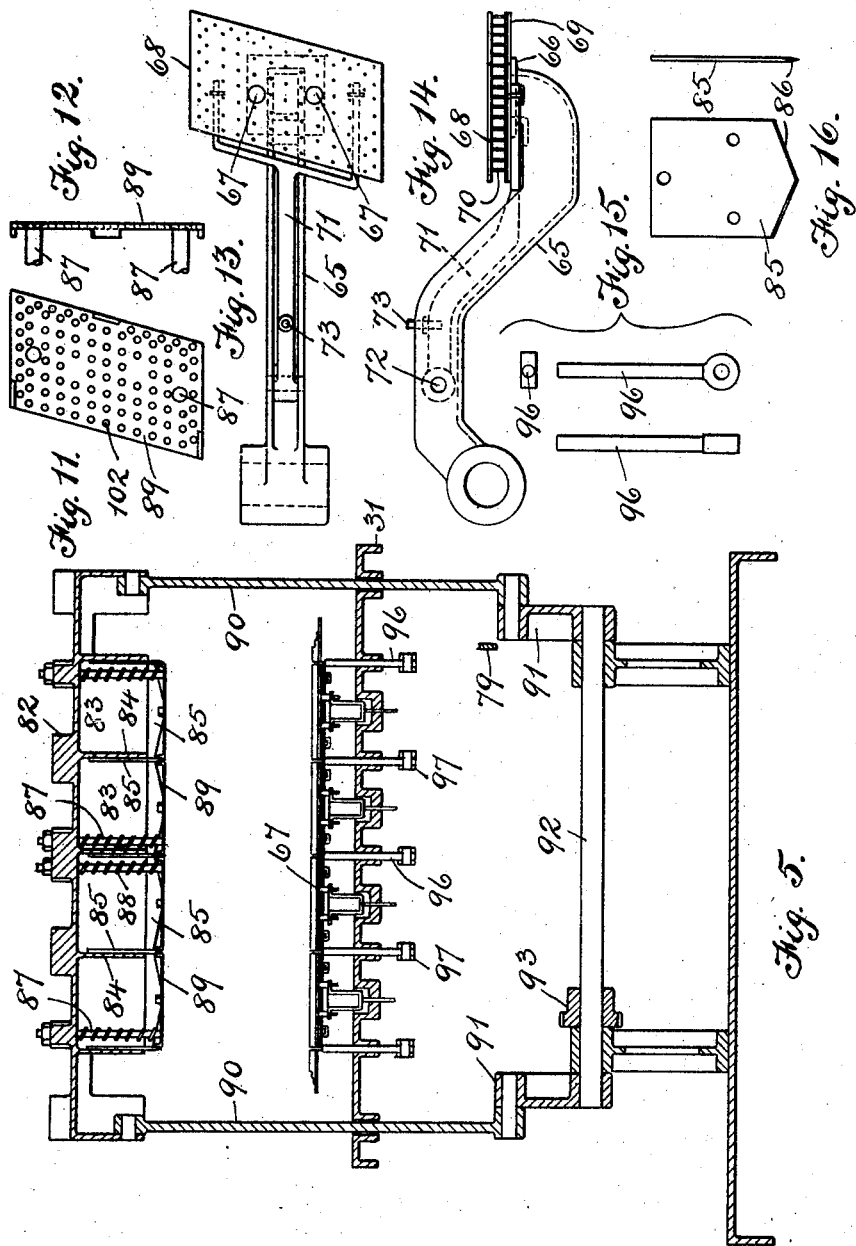

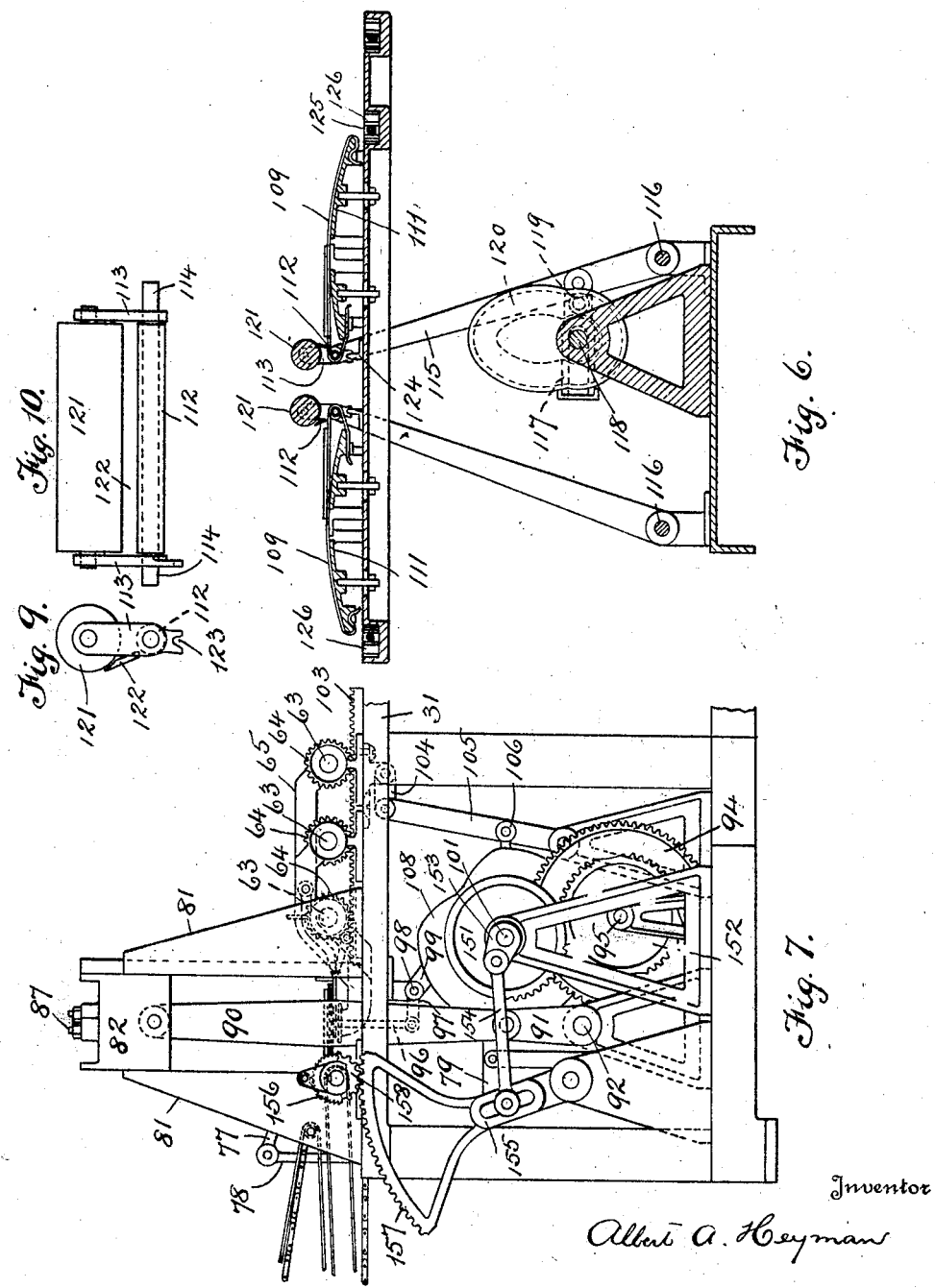

Mar. 3, 1925.
A. A. HEYMAN
1,528,482
MACHINE FOR FORMING CIGAR BUNCHES
Filed April 21, 1922    8 Sheets-Sheet 3
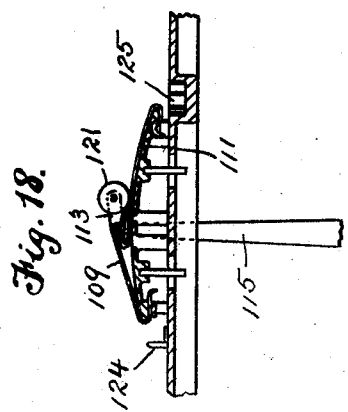
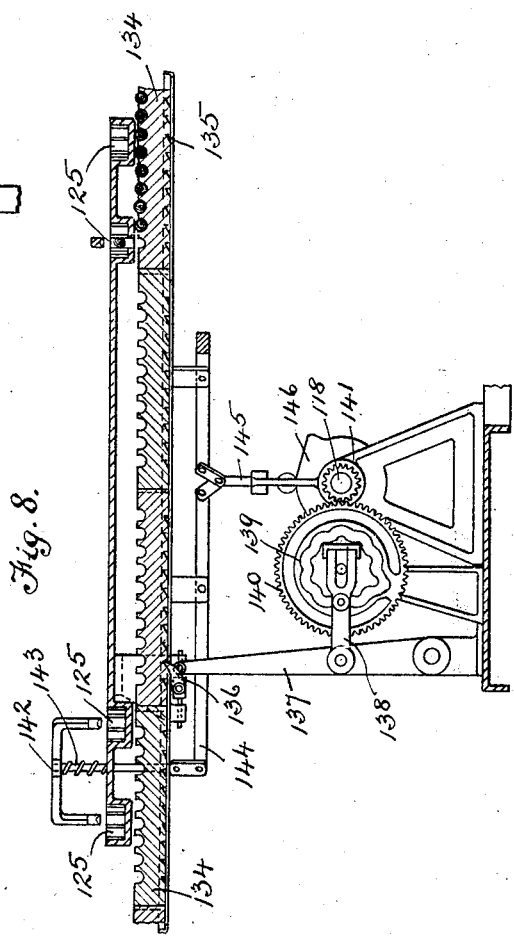

Patented Mar. 3, 1925.

1,528,482

UNITED STATES PATENT OFFICE.

ALBERT A. HEYMAN, OF BALTIMORE, MARYLAND, ASSIGNOR TO THE UNIVERSAL CIGAR MACHINERY CO., INC., A CORPORATION OF MARYLAND.

MACHINE FOR FORMING CIGAR BUNCHES.

Application filed April 21, 1922. Serial No. 555,912.

*To all whom it may concern:*

Be it known that ALBERT A. HEYMAN, a citizen of the United States, residing at Baltimore, in the State of Maryland, has invented certain new and useful Improvements in Machines for Forming Cigar Bunches, of which the following is a specification.

This invention relates to an improved machine for forming cigar bunches.

The object of the invention is to provide a machine that will assemble and bring together in a superimposed pile, a plurality of layers of tobacco, either of a single grade or of different grades; to cut the pile of tobacco into proper shape; to roll the cut shapes into bunches and apply the binder, and to transfer the bunches and deposit them into molds.

Another object of the invention is to provide means for receiving tobacco in a single layer and conveying it to cutters; then cutting through the tobacco to produce the desired shape and size and then rolling the cut shapes into bunches.

The invention is illustrated in the accompanying drawings, wherein,—

Figs. 1, and 1ª, show the machine in side elevation.

Figs. 2, and 2ª, illustrate the same in top plan.

Fig. 3. shows in a diagrammatic way the arrangement of the conveyor and clamping belts that effect the assembling of the layers of tobacco.

Fig. 4. illustrates in top plan view the shafts and mechanisms operated thereby for effecting the various operations.

Fig. 5. shows a vertical cross-sectional detail through the cross-head and its operating mechanism.

Fig. 6. illustrates a vertical cross-sectional detail through two of the rolling mechanisms.

Fig. 7. shows in side elevation a portion of the machine adjacent to the cross-head mechanism, but viewed from the opposite side of the machine from that shown in Fig. 1ª.

Fig. 8. illustrates a vertical cross-sectional detail through the mold devices and their actuating mechanism.

Figs. 9 and 10, show side and front views respectively of the roller devices used in winding the filler into a roll.

Figs. 11 and 12. show bottom plan and edge views respectively of the clamping plate carried by the cross-head.

Figs. 13 and 14. illustrate top plan and side elevations respectively of one form of means to transfer the cut shapes of tobacco.

Fig. 15. shows several views of one of the actuating stems which are utilized to operate the pin plates.

Fig. 16. illustrates one of the cutter blades in front view and edge elevation.

Fig. 17. shows a cross-sectional detail through one of the pin-plates and perforated plates and the studs that connect the two, and Fig. 18. illustrates a detail of the rolling bed, rolling belt and the filler or bunch partly wound.

By referring to Figs. 1, 1ª, 2, 2ª and 3 of the drawings, it will be noted that the machine is provided with a horizontal frame 25, which sustains vertically-extending bearing blocks 26, 27, 28, 29 and 30, respectively, and that beyond the bearing block 26, the machine is provided with a main frame 31, across the top of which there extends a horizontal cross-shaft 32.

This cross-shaft is provided at one end with a sprocket wheel 33, while the opposite end carries means by which said shaft is intermittently rotated, as will presently be explained.

Cross-shaft 32, also serves as a roller between the sprocket wheel 33 and rotating means so that a long conveyor belt 35, may pass around and be driven by said shaft.

This conveyor belt 35, extends past the bearing blocks 26, 27, 28 and 29, and passes around an idle roller 36, that is adjustably carried in bearings 37, in the block 30, so that upon each intermittent turn of shaft 32, the conveyor belt 35, will be given a movement. In this instance the upper stretch of the belt 35, travels from roller 36, toward shaft 32.

Bearing block 26, also carries a horizontal shaft 38, on which there may be a tight roll 39, shown in Fig. 3, and a conveyor belt 40, passes around this roll and extends between the bearing blocks 27 and 28, and passes around an idle roll on a shaft 41. This shaft 41, is mounted adjustably in a bearing 42, in the bearing block 29, so that adjustment of the belt may be effected.

A horizontal shaft 43, is mounted in bearing block 27, and carries a tight roll 44, see see Fig. 3, around which a conveyor belt 45, passes and this latter belt extends to and passes around a roll on shaft 46, which latter is carried in a bearing 47, that is adjustable in bearing block 28.

It will thus be understood that conveyor belt 35, is lowermost and is longest; that belt 40, has position over but is shorter than belt 35, and that belt 45, is located above but is shorter than the belt 40.

Shafts 32, 38, and 43, are provided with sprockets while an idler sprocket 48, is provided on bearing block 27, so that a sprocket chain 49, may be passed around said sprockets, drive the latter and the rolls thereon.

As shaft 32, is intermittently revolved its sprocket 33, will be revolved and the chain 49, will be intermittently moved, consequently an intermittent movement will be given each conveyor belt so that the upper stretch of each belt will move step-by-step toward the shaft 32.

Shaft 32, carries a gear 50, which meshes with and drives a gear 51, on a roll shaft 52, and a clamping belt 53, in the present instance consisting of a series of straps, which pass around said shaft 52, and is driven by said gears as a shaft 32, is rotated.

This clamping belt 53, has an upper stretch that extends in an inclined direction to and passes around a roll 54, that is carried in a bearing 55, in the bearing block 27. After passing around said roll 54, the belt 53, travels adjacent to and with the upper stretch of the conveyor 45, and as the belt then leaves the conveyor 45, it inclines downwardly in front of roll 44, and passes beneath a guide roller 56, after which it travels a short distance parallel with the upper side of conveyor belt 40, and then inclines downwardly over roller 39, and passes beneath another guide roller 57. From the guide roller 57, the lower stretch of the clamping belt travels parallel with the upper stretch of the lowermost conveyor belt 35, and only turns from this last path when it reaches the driving roll 52. It will thus be seen that the clamping belt 53, has a lower stretch that travels successively over the discharge-ends of conveyor belts 45, 40 and 35, for the purpose of transferring tobacco from the upper belt 45, onto tobacco on the intermediate belt 40, and finally onto another layer of tobacco on the lowermost belt 35, as will presently be more fully explained.

In the operation of this part of the invention the tobacco leaves 58, 59 and 60, are laid on the exposed surfaces of the three conveyor belts 35, 40 and 45 respectively, as shown in Fig. 2, of the drawing, the leaves being spread in a substantially uniform layer on each belt. As the belts are moved forward, the tobacco 60, spread on belt 45, passes beneath the clamping belt 53, and is held down by the latter during the discharge of the tobacco from belt 45, down the inclined transfer board 61, onto the layer of tobacco 59, on the belt 40. The two layers of tobacco then travel forward with belt 40, and then discharge downwardly over another inclined board 62, and are deposited onto the layer of tobacco 58, on the lower belt 35.

The three layers of tobacco are then advanced with belt 35, until they reach a point where the three-ply layer is to be clamped and cut into the shape and size that is to form the bunches, as will now be explained.

By referring to Figs. 1ª, 2ª, 5, 7 and 11 to 14, it will be seen that on top of the main frame 31, I provide, in the present instance three horizontal rock shafts 63, each of which rigidly carries a circular rack wheel 64. Each shaft 63, carries an arm 65, that normally extends laterally toward the horizontal shaft 32 and the free end of each arm is provided with a flat head 66, which has two studs 67, projecting from one side thereof, as best seen in Fig. 17, of the drawing, which studs rigidly engage and sustain a perforated plate 68. Between the plate 68, and head 66, each arm is also provided with a pin plate 69, from one side of which there projects a series of pointed pins 70. These pins are in registering relation with respect to the perforations in the plate 68, so that at certain periods the pins may be projected through the said perforations. The pin plate 69, is movable on the studs 67, and between the head and perforated plate, and to the bottom of said pin plate there is connected two prongs of a releasing lever 71, which latter is pivoted at 72, to the arm 65. This lever 71, has a pin 73, projecting therefrom by means of which the lever is operated to move the pin plate toward the head 66, to retract the pins, as and for a purpose that will presently be explained.

In the normal position, the arms 65, are swung forwardly and the perforated plates 68, have a horizontal position at the end of conveyor belt 35, as shown in Figs. 1ª, and 3, of the drawings, so that the three-ply layer or layers 74, of tobacco will be fed forward and onto the flat surfaces of the perforated plates 68.

Having thus delivered the layer or layers of tobacco on the perforated plates, the next step in the operation is to clamp the layer or layers prior to cutting therefrom the shapes and sizes desired for each cigar bunch, which will now be explained.

Above the roll shaft 52, I provide a horizontal rock-shaft 75, which latter carries a plurality of rock-arms each with a clamping plate 76, thereon. These clamping plates have position that will enable them to move down and clamp the tobacco along the edges of the perforated plates 68, and movement is imparted to said plates by rocking the shaft 75, through the arm 77, rod 78, rock-lever 79 and cam 80.

Having clamped the layer or layers of tobacco, the next step in the operation of the machine is to clamp that portion which is to form the fillers or bunches and then cut said portion from the layer or layers. This is effected through the action of a reciprocating clamping and cutter head, now to be explained.

At opposite sides of the machine, the main frame 31, sustains vertical guides 81, and a cross-head 82, is sustained between said guides so it may be vertically reciprocated. The cross-head is provided with a plurality of depending walls 83, and 84, to which vertical cutter-blades 85, are attached,—the lower edges 86, of which blades are sharpened to perform the cutting operation as the head is lowered over the perforated plates 68. The particular arrangement of the cutter blades is shown in Fig. 2ª, wherein they are illustrated in top plan and by broken lines.

The cross-head 82, carries a plurality of depending stems 87, which extend freely through the top of said head, and said stems carry coiled springs 88, on the under side of the top of the head which springs have their lower ends seated against the upper sides of clamping plates 89, that are carried on the lower end of and move with the stems. It will thus be understood that the cross-head, clamping-plates, stems, springs and cutter blades all move vertically together, but that the clamping plates and stems have a vertical movement in the cross-head so that when the latter descends the clamping plates may seat on the layer or layers 74, of tobacco immediately before the edges 86, of the blades 85, cut through said layer or layers so that by first clamping the tobacco, the cross-head by continuing its stroke may effect the cutting operation without liability of displacing the tobacco.

The cross-head is moved vertically by means of connecting-rods 90, one at each side, which rods are connected at their lower ends by cranks 91, on a horizontal shaft 92. Shaft 92, carries a gear 93, which meshes with and is driven by a gear 94, on a horizontal shaft 95, the latter receiving its motion by means presently to be described.

Immediately after a cut has been made, which in this instance cuts four shapes of stock to be made into bunches, and prior to the release of the clamping plates 89, I provide devices to actuate the pin plate 69, to project the pins 70, through the perforated plates 68, and also through the cut stock on the said plates 68, whereby to hold the stock on the perforated plates during their transfer from the cutting position to another position where the rolling of the stock into a bunch takes place. This pin plate operating means comprises a plurality of stems 96, which are vertically disposed beneath the pin plates and whose lower ends are pivotally connected to the free ends of short arms 97, that project from a horizontal rock-shaft 98. The rock-shaft 98, has an arm 99, that extends downwardly from the shaft and has a roller that travels in a groove of a cam 100, on a continuously-revolving horizontal shaft 101. As the cam 100, rocks arm 99, and shaft 98, the stems 96, will be elevated to engage the under sides of the pin plates, and by so doing, move the pin plates and pins upwardly, thereby forcing the pins 70, through the clamped and cut tobacco stock,—the ends of the projected pins entering perforations 102, in the clamping plates 89.

This upward movement of the pin plates and pins also causes the releasing levers 71, to swing up slightly thereby elevating the releasing pins 73, which on the next operation will perform their function, as will presently be explained.

After the pins have been moved into the cut stock, the cross-head 82, will move up, but the clamps 76, will still hold the edge of the plural ply layer 74, until the transfer of the cut sizes of stock has been effected.

A rack-bar 103, is located on the upper side of the main frame directly beneath the circular rack wheels 64, and the bottom side of this rack-bar is connected by a link 104, see Fig. 7, with the upper end of a rock lever 105. The lever is pivotally connected to a link 106, which straddles the cam shaft 101, and which has a roller 107, that travels in a groove in the side of a cam 108. As cam 108, is revolved it will rock the lever 105, and thereby move rack-bar 103, toward the shaft 32, and by this movement will partially rotate the wheels 64; rock the shafts 63, and swing all the arms 65, (four in number) from beneath the cross-head, turning them through a half circle and reversing them. The arms vary in length, and each one during its reversal will swing rearwardly so as to turn the perforated plates 68, up-side-down to present the cut tobacco stock to rolling belts 109.

As the arms 65, swing over rearwardly to turn the cut stock up-side-down and deposit it on the rolling belts, the releasing pins 73, will contact with the bed of the machine and actuate the releasing levers 71, in a direction to move the pin plate 69, toward the head 66, thereby withdrawing the pins 70, from the stock and allowing the latter to drop from the inverted face of perforated plates 68, onto the rolling belts, and the arms 65, are then swung back to their forward positions.

The cut stock having been deposited on the rolling belts 109, as shown in Fig. 2ª, of the drawing, the next operation is to roll the stock which now becomes the filler for the cigar, and to also enclose the filler in a binder.

Prior to this rolling operation, the attendants will place on one end of each rolling belt, in front of the filler, a leaf of tobacco 110, which is to form the binder and the rolling operation then takes place as will now be explained.

As the mechanism for operating one rolling belt is exactly like that for the others, a description of one is deemed sufficient.

Beneath the rolling belt 109, I provide a rolling table 111, and the belt extends over that table with its opposite ends secured beneath the latter. The belt has a fullness or is longer in a direction lengthwise of the table and said belt passes around a free roller 112, that extends in a crosswise direction with respect to the table. This roller 112, is carried between two arms 113, and the shaft 114, on which said roller turns has its ends projecting beyond the sides of the arms 113, so that rock-arms 115, may be pivotally connected to said shaft-ends. These rock-arms have their lower ends connected to short shafts 116, at the base of the main frame, and, in the present instance, at least one arm of each pair of arms, pivotally carries a link 117, which extends horizontally therefrom and straddles a central longitudinal shaft 118. The link 117, carries a roller 119, that travels in a side groove in a cam 120, on said shaft 118, so that at each revolution of the shaft and cam, the rock-arms 115, will be swung forward and then returned.

The arms 113, at the upper ends of rock-arms 115, also sustain a horizontal roller 121, and said arms carry a cross plate 122, which extends crosswise of the rolling belt 109. The lower end of one of the arms 113, has a notch 123, therein, shown best in Fig. 9, of the drawing, and this notch, when the rolling devices are at one end of the rolling table, engages a lug 124, on the table top so as to rock the arms 113, and lift the roller 121, from the belt 109, as shown in Fig. 6, of the drawing.

When the rock-arms 115, are moved from the normal position shown in Fig. 6, of the drawing, the arms 113, are turned down as they are disengaged from the lug 124. This turning-down movement causes the roller 121, to press the end of the cut stock or filler and the rolling belt close down on the rolling table 111, and thereby produce a loop in the belt, as shown in Fig. 18, of the drawings. As the arms 115, swing along the opposite sides of the rolling table 111, the loop formed in the belt will be moved lengthwise of the rolling table, like a wave, and this traveling loop will coil or roll the stock. When the binder 110, is reached, it will be taken up by the traveling loop and wound about the rolled filler so that at the end of the stroke of the arms 115, the stock will be wound in a roll with the binder on the exterior to hold it in the wound condition.

At the end of each rolling table I provide the table top of the machine with a longitudinal channel 125, shown in Figs. 2ª, 6 and 8, of the drawings, and each channel is provided with conveyor belts 126, which engage and move the cigar bunches forward from the rolling table to a mold mechanism in which the bunches are placed for the purpose of imparting the proper shape to them. These belts are driven from vertical shafts 127, which in turn are revolved by gears 128, 129 and horizontal shaft 130. Shaft 130, is intermittently rotated by means of a segment-rack 131, and ratchet 132,—a cam 133, imparting movement to the rack.

Beneath the table top and also beneath the cigar channels 125, I provide a series of molds 134, each having cavities to receive the cigars. The bottoms of these molds are provided with a series of recesses 135 in which a reciprocating pawl device 136, may engage, one after another, and advance the molds step-by-step to present the successive cavities to the cigar channels.

Movement is imparted to the pawl device through the action of a lever 137; a link 138, and a cam 139, as shown in Fig. 8, of the drawing. Cam 139, has gear teeth 140, around its circumference which mesh with and are driven by a pinion 141, on shaft 118.

In order to ensure that the cigars will be forced down into the mold cavities from the channels 125, I provide a reciprocating plunger device 142, which depends over the cigar to be discharged and which is reciprocated vertically by a rod 143, and rock bar 144,—the latter in turn being actuated by a vertical rod 145, through a cam 146, on shaft 118.

Shaft 118, receives its motion from a worm wheel 147, which is driven by a worm, not shown, on the main driving shaft 148, and a worm 149, on shaft 118, driven worm wheel 150, on shaft 101, and shaft 95, is intermittently driven by an intermittent gear 151, on shaft 101, which meshes with and drives the gear 152.

A crank 153, is provided on the end of shaft 101, and said crank has a pitman rod 154, which engages a segment rack bar 155, and causes the latter to oscillate.

Shaft 32, loosely carries a pinion gear 158, which latter carries a ratchet wheel 156, Both the pinion gear and ratchet wheel are free to turn in one direction independently of the shaft 32, but will operate the shaft when they are turned in a reverse direction. By this means shaft 32, receives its intermittent movement and conveyor belts 35, 40, and 45 are operated step-by-step as described.

In some instances it is found desirable to utilize scraps or short pieces of tobacco in the filler and to do this with facility I provide over one or more of the conveyor belts a hopper 159, which in practice is provided with a feed by which such scrap or shorts may be deposited on the layer of tobacco leaf or conveyor belt as it travels beneath such hopper.

It is obvious that while in the present instance I show a machine wherein a plurality of belts are employed to assemble layers, or piles of tobacco I may vary the number of belts so employed and in some instances may use only one belt, and that the bunches may be cut either from a single layer or from the assembled layers.

Having described my invention, I claim,—

1. In a machine of the class described the combination with a plurality of endless conveying means each for receiving tobacco filler in separated flat layers, of means for intermittently operating said conveying means and for advancing the several flat layers of tobacco and superposing them by placing one layer on top of and in contact with another; means for clamping the superposed layers of tobacco while they are at rest and automatic means for cutting the combined superposed layer while the latter is in a flat condition.

2. In a machine of the class described the combination with a plurality of overlapping conveyers each for receiving a flat layer of tobacco, of means for moving said conveyors to deliver one layer of tobacco on top of another; a clamping means for clamping the combined layers; means for cutting the combined layers while the latter are clamped; means for transferring the cut portions of the layers from the cutting means and means for winding the cut portions of the layers into rolls.

3. In a machine of the class described the combination with a plurality of conveyor belts one above another and of different lengths each of said belts to receive a layer of tobacco filler, of means at the discharge-ends of the belts for directing the tobacco layers of the upper belts into a single thick layer on the lower belt; means for cutting through the single thick layer to form shapes of filler for bunches means for transferring the cut shapes of filler to a rolling means and means for rolling said shaped filler into rolls.

4. In a machine of the class described the combination with a plurality of conveyor belts one above another and of different lengths and each belt to receive a layer of tobacco filler, of means for directing the filler layer of an upper belt onto the layer of a lower belt; transfer means to receive the combined layers of filler; means for cutting through the combined layers to form cut shapes of filler; means for actuating the transfer means to move the cut shapes of filler from the cutting position and a rolling mechanism to receive the cut filler from the transfer means and for rolling the same into rolls.

5. In a machine of the class described the combination with a plurality of conveyer belts one above another and each belt to receive a layer of tobacco filler, of means for superposing the several layers of filler and forming a thick layer of filler; transfer means to receive the thick layer of filler; means for cutting through the said thick layer of filler while it is on the transfer means to form cut shapes of filler; a rolling mechanism to receive the cut filler; means for moving the transfer means to deposit the cut filler on the rolling mechanism and means for actuating the said rolling mechanism to wind the cut filler into a roll.

6. In a machine of the class described the combination with a plurality of conveyers each for receiving a layer of tobacco filler, of means for merging the plural layers one upon another; transfer means in the path of the merged layers to receive the forward edge of said layer; a plurality of rolling belts beyond the transfer means; a series of cutters to cut the layer of filler while it is on the transfer means and thereby form a series of cut filler-shapes and means for operating the transfer means to bodily lift the cut filler shapes and deposit them on the rolling belts.

7. In a machine of the class described the combination with a plurality of pivoted transfer arms each having a flat plate, of means for feeding a flat layer of tobacco filler onto the plates of said arms; means for cutting through the flat layer of filler while the latter is on said flat plates to cut flat shapes of cigar fillers therefrom; means for moving said pivoted arms, plates and cut flat shapes of filler to a rolling mechanism and rolling mechanism for rolling the cut flat shapes.

8. In a machine of the class described the combination with a plurality of pivoted transfer arms each having a flat plate, of means for feeding a flat layer of tobacco filler onto the plates of said arms; means for cutting through the flat layer of filler while the latter is on said plates to cut flat shapes of cigar fillers therefrom; a rolling mechanism; means for engaging the cut flat filler and holding it on said plates and means for swinging the pivoted arms, plates and cut filler over and depositing the cut filler onto said rolling mechanism.

9. In a machine of the class described the combination with a plurality of swinging arms each having a perforated plate, of means for feeding tobacco filler onto said plates; means for cutting said filler while it is on said plates; pins movable into the cut filler to hold the latter on the plates; a rolling mechanism; means for swinging the arms; plates and cut filler over the rolling mechanism and means for withdrawing the pins to release the filler and deposit the same on the rolling mechanism.

10. In a machine of the class described the combination with cutters, of means for feeding a layer of tobacco filler to said cutters; a rolling mechanism; an arm pivotally sustained to swing from the cutters to the rolling mechanism; a perforated plate carried by said arm; a pin plate also carried by said arm and provided with pins to pass through said perforated plate and means for swinging said arm from one position to the other.

11. In a machine of the class described the combination with a plurality of endless conveyor belts one above another arranged with the delivery point of each lower belt in advance of the delivery point of the belt next above it of a directing belt for directing flat tobacco filler from an upper belt onto the next lower belt a plurality of flat plates for receiving the tobacco filler from the lower belt, means for clamping the flat filler while it is on said flat plates, cutters for cutting the flat filler into shapes while it is held clamped on said plates, a rolling mechanism, and means for moving the flat plates with the flat cut shapes of filler thereon to the rolling mechanism to be rolled into bunches.

In testimony whereof I affix my signature.

ALBERT A. HEYMAN.